United States Patent
Sohn et al.

(10) Patent No.: US 10,630,926 B2
(45) Date of Patent: Apr. 21, 2020

(54) ANTI-ECLIPSE CIRCUIT AND RELATED IMAGER

(71) Applicant: HIMAX IMAGING LIMITED, Tainan (TW)

(72) Inventors: Youngchul Sohn, Tainan (TW); Kwangoh Kim, Tainan (TW); Amit Mittra, Tainan (TW)

(73) Assignee: HIMAX IMAGING LIMITED (TW)

( * ) Notice: Subject to any disclaimer, the term of this patent is extended or adjusted under 35 U.S.C. 154(b) by 1 day.

(21) Appl. No.: 15/613,142

(22) Filed: Jun. 3, 2017

(65) Prior Publication Data

US 2018/0352180 A1 Dec. 6, 2018

(51) Int. Cl.
*H04N 5/374* (2011.01)
*H04N 5/359* (2011.01)

(52) U.S. Cl.
CPC ........... *H04N 5/374* (2013.01); *H04N 5/3598* (2013.01)

(58) Field of Classification Search
CPC ......... H04N 5/363; H04N 5/374; H04N 5/378
USPC ....................................... 348/241
See application file for complete search history.

(56) References Cited

U.S. PATENT DOCUMENTS

| | | | | |
|---|---|---|---|---|
| 2003/0080279 A1* | 5/2003 | Afghahi | ................ | H04N 5/361 250/208.1 |
| 2005/0195033 A1 | 9/2005 | Sakurai | | |
| 2006/0044414 A1* | 3/2006 | Lee | ...................... | H04N 5/3598 348/230.1 |
| 2006/0227226 A1* | 10/2006 | Olsen | ................... | H04N 5/3598 348/241 |
| 2006/0238634 A1* | 10/2006 | Yan | ...................... | H04N 5/3598 348/308 |
| 2006/0278809 A1* | 12/2006 | Takayanagi | .......... | H04N 5/3598 250/208.1 |
| 2012/0249851 A1* | 10/2012 | Martinussen | ........ | H04N 5/3598 348/308 |
| 2013/0083204 A1* | 4/2013 | Solhusvik | .............. | H04N 5/378 348/187 |
| 2013/0193334 A1* | 8/2013 | Dowaki | .................... | H04N 5/32 250/370.09 |
| 2015/0237275 A1 | 8/2015 | Iwata et al. | | |
| 2015/0373290 A1* | 12/2015 | Vogelsang | ............. | H04N 5/378 348/302 |
| 2016/0065868 A1 | 3/2016 | Olsen | | |
| 2018/0184026 A1* | 6/2018 | Kato | ...................... | H04N 5/365 |
| 2019/0110012 A1* | 4/2019 | Hagihara | .............. | H03M 1/406 |

* cited by examiner

*Primary Examiner* — Sinh Tran
*Assistant Examiner* — Zhenzhen Wu
(74) *Attorney, Agent, or Firm* — SU IP Consulting

(57) ABSTRACT

An anti-eclipse circuit for use in an imager includes a differential amplifier and a feedback circuit. The differential amplifier is coupled to an output line for receiving an output signal associated with the voltage level of a floating diffusion region in a pixel of the imager and configured to detect when a reset signal received from the pixel drops below a predetermined level. The feedback circuit is configured to increase the reset signal when the output signal is lower than the clamp voltage, thereby keeping the reset signal at the constant level.

4 Claims, 7 Drawing Sheets

ANTI-ECLIPSE CIRCUIT AND RELATED IMAGER

BACKGROUND

Unless otherwise indicated herein, the approaches described in this section are not prior art to the claims in this application and are not admitted to be prior art by inclusion in this section.

Various techniques have been developed for obtaining digital X-ray and gamma ray images of an object for purposes such as X-ray diagnostics, medical radiology, non-destructive testing, and so on. Among different types of semiconductor-based imagers, a complementary metal-oxide-semiconductor (CMOS) imager includes a focal plane array of pixel cells, each one of the cells including either a photogate or a photodiode overlying a substrate for accumulating photo-generated charge in the underlying portion of the substrate. A readout circuit is connected to each pixel cell and includes at least an output field effect transistor formed in the substrate and a charge transfer section formed on the substrate adjacent the photogate or photodiode having a sensing node, typically a floating diffusion region, connected to the gate of an output transistor. The CMOS imager may include at least one electronic device such as a transistor for transferring charge from the underlying portion of the substrate to the floating diffusion region and one device, also typically a transistor, for resetting the node to a predetermined charge level prior to charge transference.

In a CMOS imager, the active elements of a pixel cell perform the functions of: (1) photon to charge conversion; (2) accumulation of image charge; (3) transfer of charge to the floating diffusion region accompanied by charge amplification; (4) resetting the floating diffusion region to a known state before the transfer of charge to it; (5) selection of a pixel for readout; and (6) output and amplification of a signal representing pixel charge. A photo charge may be amplified when it moves from the initial charge accumulation region to the floating diffusion region. The charge at the floating diffusion region is typically converted to a pixel output voltage by a source follower. The photosensitive element of a CMOS imager pixel is typically either a depleted p-n junction photodiode or a field induced depletion region beneath a photogate.

A conventional CMOS imager is susceptible to a type of distortion known as eclipsing. Eclipsing can occur when at least some pixels of the CMOS imager are exposed to strong light such as direct illumination from the sun. The strong light may cause electrons to spill over from the photodiode into the floating diffusion region, which results in an erroneous reset signal to be sampled (e.g., reset signals sampled during reset operations may exhibit voltage levels that are less than the desired reset level). Consequently, the pixel signal computed by a column readout circuitry becomes an undesirably small value, the effect of which is manifested when an over-illuminated pixel appears dark while it should be bright.

FIG. 1A is a schematic diagram of a pixel 100 and a source follower 250 for use in a conventional CMOS imager. The pixel 100 includes a light sensitive element PX (shown as a photodiode), a floating diffusion region FD, and four transistors M1~M4. The source follower 250 includes an anti-eclipse circuit 35. The conventional anti-eclipse circuit 35 is configured to correct the voltage level of the reset signal by pulling the reset level up to a corrected voltage, thereby minimizing the eclipse effect. However, the actual clamp level of the anti-eclipse circuit 35 may drop with the increased load current $I_{LOAD}$, thereby narrowing the dynamic range of the pixel voltage $V_{PX}$ (the difference between the sampled reset signal and the photo signal). The output swing of the pixel voltage $V_{PX}$ may lower the saturation of an image, such as a bright sun appearing to be a gray object.

It would therefore be desirable to provide a CMOS imager with an anti-eclipse circuitry for compensating errors caused by the eclipse phenomenon.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

The technical details set forth in the following description enable a person skilled in the art to implement one or more embodiments of the present disclosure.

Figure 1A:
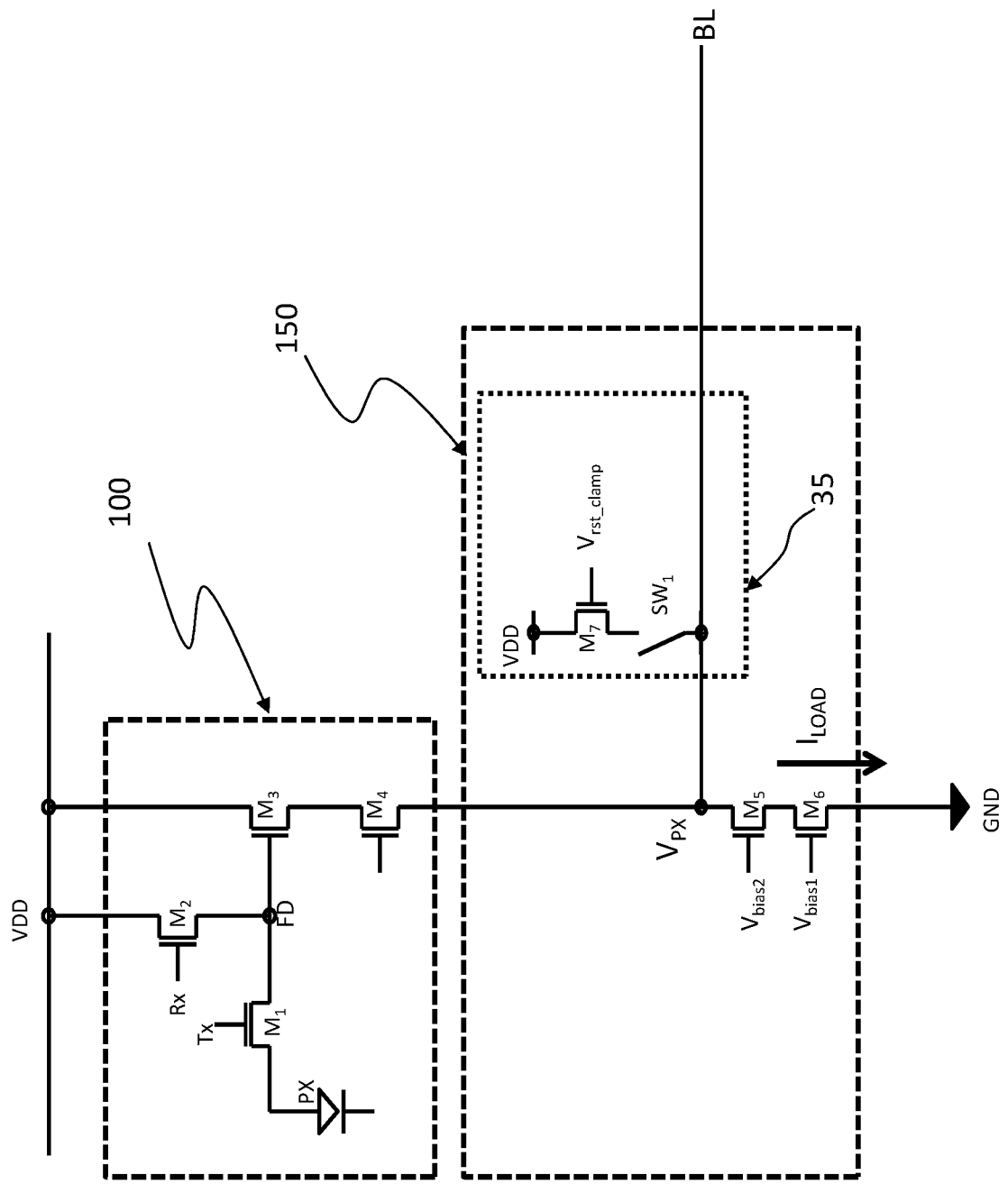
FIG. 1A is a schematic diagram of a pixel and a source follower for use in a conventional CMOS imager.
Figure 1B:
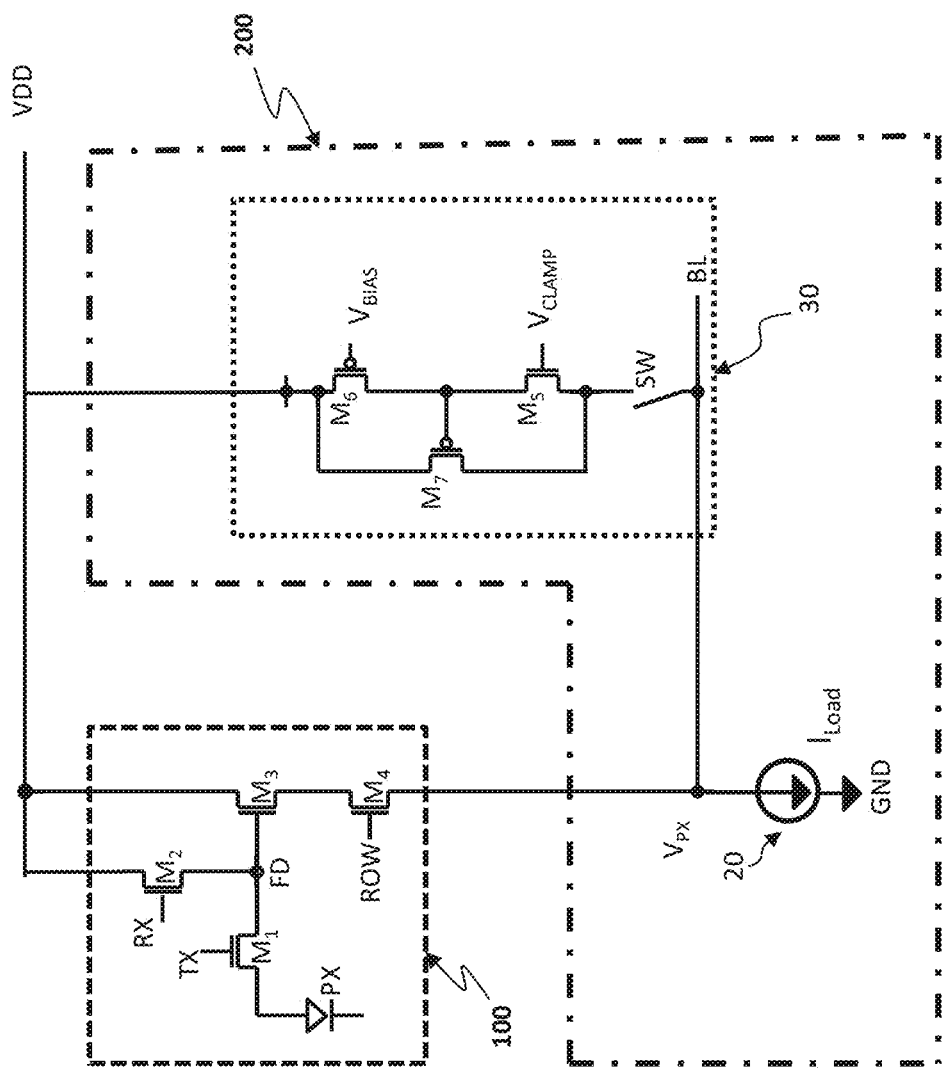
FIG. 1B is a schematic diagram of a pixel and a source follower for use in a CMOS imager in accordance with at least some embodiments of the present disclosure.

FIG. 1B is a schematic diagram of a pixel 100 and a source follower 200 for use in a CMOS imager in accordance with at least some embodiments of the present disclosure. The pixel 100 includes a light sensitive element PX (shown as a photodiode), a floating diffusion region FD, and four transistors M1~M4. The pixel 100 receives a TX control signal for controlling the conductivity of the transistor M1, a RX control signal for controlling the conductivity of the transistor M2, and a ROW control signal for controlling the conductivity of the transistor M4. The charge at the floating diffusion region FD controls the conductivity of the transistor M3. The output of the transistor M3 is presented to the source follower 200 through the transistor M4, which outputs a pixel signal $V_{PX}$ to an output line BL when the transistor M4 is conducting.

The states of the transistors M1 and M2 determine whether the floating diffusion region FD is coupled to the light sensitive element PX for receiving a photo generated charge as generated by the light sensitive element PX during a charge integration period, or is coupled to a pixel power VDD during a reset period.

In accordance with some embodiments of the present disclosure, during the reset period, the ROW control signal is asserted to cause the transistor M4 in the pixel 100 to conduct. At the same time, the RX control signal is asserted while the TX control signal is not asserted, thereby coupling the floating diffusion region FD to the pixel power VDD and resetting the voltage at the floating diffusion region FD to the level of the pixel power VDD. The pixel 100 then outputs a reset signal Vrst to the source follower 200.

After the reset level Vrst has been sampled, the RX control signal is de-asserted. The light sensitive element PX is exposed to incident light and accumulates charges on the level of the incident light during the charge integration period. After the charge integration period, the TX control signal is asserted, thereby coupling the floating diffusion region FD to the light sensitive element PX. Charge flows through the transistor M1 and diminishes the voltage at the floating diffusion region FD. The pixel 100 then outputs a photo signal Vsig to the source follower 200. The reset signal Vrst and the photo signal Vsig are different components of the overall pixel output signal $V_{PX}$ (i.e., $V_{PX}$=Vrst−Vsig).

The source follower 200 includes a load circuit 20 and an anti-eclipse circuit 30. The load circuit 20 functions as a current source whose value $I_{LOAD}$ determines the readout time of the pixel 100. The anti-eclipse circuit 30 includes transistors M5~M7 and a switch SW. When operating in an anti-eclipse scheme with the switch SW turned on, the anti-eclipse circuit 30 is coupled in parallel with the pixel 100.

In one embodiment of the present disclosure, the transistor M5 may be implemented using an n-type transistor having a drain terminal coupled to the gate terminal of the transistor M7, a source terminal coupled to the output line BL, and a gate terminal coupled to receive a clamp voltage $V_{CLAMP}$. The transistor M6 may be implemented using a p-type transistor having a source terminal coupled to the pixel power VDD, a drain terminal coupled to the gate terminal of the transistor M7, and a gate terminal coupled to receive a bias voltage $V_{BIAS}$. The transistor M7 may be implemented using a p-type transistor having a source terminal coupled to the source terminal of the transistor M6, a drain terminal coupled to the source terminal of the transistor M5, and a gate terminal coupled between the drain terminals of the transistors M5 and M6.

Figure 2:
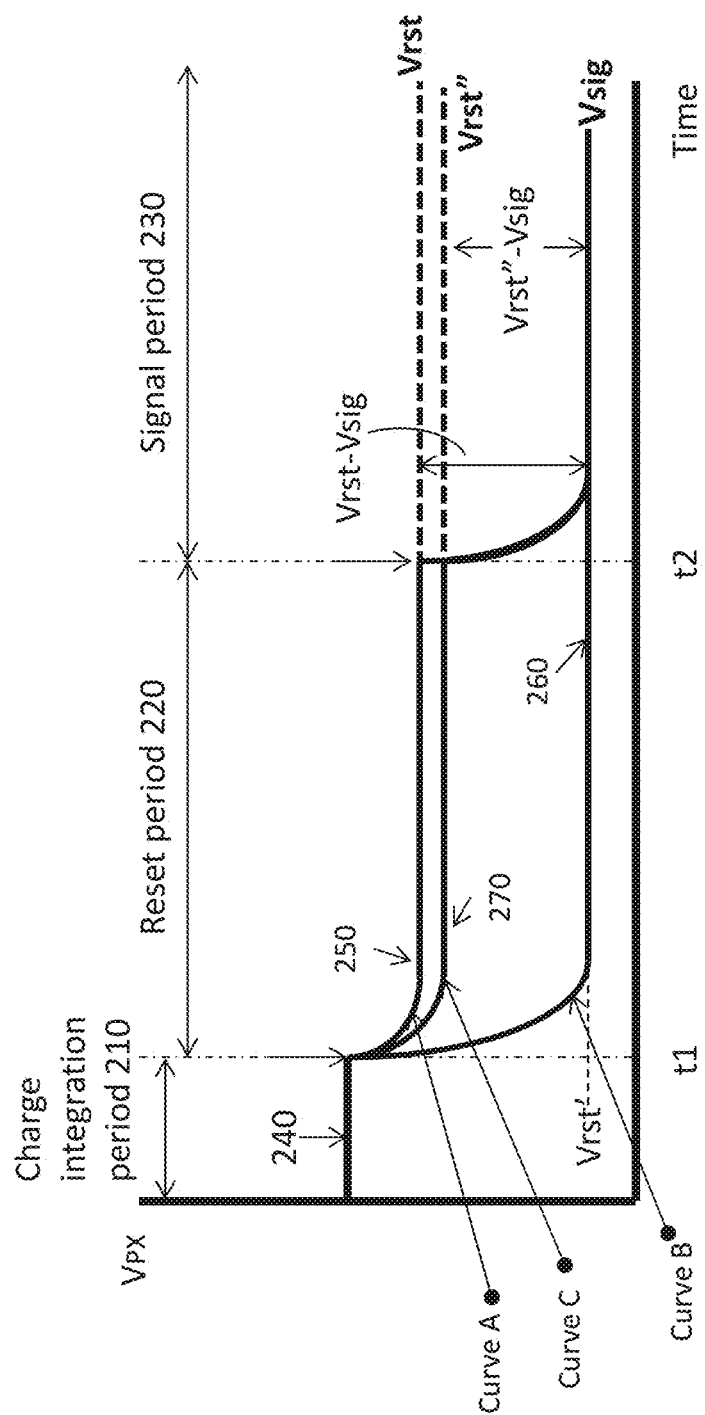
FIG. 2 is a diagram illustrating some operations of a pixel and a source follower in accordance with at least some embodiments of the present disclosure.

FIG. 2 is a diagram illustrating some operations of the pixel 100 and the source follower 200 in accordance with at least some embodiments of the present disclosure. The vertical axis represents the pixel voltage $V_{PX}$ sampled on the output line BL, and the horizontal axis represents time. Curve A illustrates the operations of the pixel 100 and the source follower 200 under normal light conditions. Curve B illustrates the operations of the pixel 100 and the source follower 200 under strong light conditions when the anti-eclipse circuit 30 is deactivated. Curve C illustrates the operations of the pixel 100 and the source follower 200 under strong light conditions when the anti-eclipse circuit 30 is activated. Curves A, B, and C share certain parts and are further detailed below.

Before a first time, t1, Curves A, B, and C share a same segment illustrated as a line 240 in FIG. 2. Between t1 and a second time, t2 (i.e., the reset period 200), a segment of Curve A is represented by a line 250 converging to Vrst, segment of Curve B is represented by a line 260 converging to Vsig, and a segment of Curve C is represented by a line 270 converging to Vrst". After t2 (i.e., the signal period 230), curve A converges to Vsig from Vrst, and curve C converges to Vsig from Vrst". Curve B, on the other hand, is already at Vsig at t2 and remains at Vsig after t2.

In conjunction with FIG. 2, certain voltage levels, Vrst, Vrst', and Vrst", are defined to refer to the different reset signals acquired during a reset period 220. Specifically, Vrst refers to the reset signal acquired during the reset period 220 and under normal light conditions. Vrst' refers to the reset signal acquired during the reset period 220 and under strong light conditions without any anti-eclipse mechanism. Vrst" refers to the reset signal acquired during the reset period 220 and under strong light conditions with the anti-eclipse mechanism as disclosed herein. Vrst" is also referred to as a corrected voltage.

Under normal light conditions, the light sensitive element PX is exposed to photons from incident light and generates electrons during a charge integration period 210. After the control signal RX is asserted at t1 the floating diffusion region FD is reset, and the $V_{PX}$ voltage level becomes Vrst during a reset period 220. After the control signal TX is asserted at a second point in time, t2, the electrons accumulated by the light sensitive element PX are transferred to the floating diffusion region FD, and the $V_{PX}$ voltage level becomes the photo signal, Vsig, during a signal period 230. This way, the overall pixel output $V_{PX}$ whose value is equal to (Vrst−Vsig) may be acquired, as depicted by Curve A. It should be noted that regardless of whether the anti-eclipse circuit 30 is implemented in an imager, Curve A should still characterize the operations of such an imager under normal light conditions.

Under strong light conditions, the light sensitive element PX can produce a large quantity of photo-generated charges. While the pixel 100 is outputting the reset signal Vrst, a portion of the photo-generated charges produced by the light sensitive element PX during an ongoing integration period, such as the charge integration period 210, may spill over the transistor M1 into the floating diffusion region FD even while the control signal TX is not asserted. This diminishes the reset voltage at the floating diffusion region FD and can cause the pixel 100 to output an incorrect (i.e., diminished voltage) reset signal Vrst' if the anti-eclipse circuit 30 is deactivated. This, in turn, can cause the reset and photo signals to have nearly the same voltages. As depicted by Curve B, the pixel output (Vrst'−Vsig) can therefore become approximately 0 volts, which corresponds to an output voltage normally associated with a dark pixel even though strong light has been incident upon the pixel 100.

In the present disclosure, the anti-eclipse circuit 30 is deployed to minimize the effect of eclipsing. For example, since during an eclipse a pixel's reset voltage tends to drop towards zero volt, the anti-eclipse circuit 30 can monitor the voltage level of the pixel signal $V_{PX}$ sampled on the output line BL. If the $V_{PX}$ voltage level drops below a threshold voltage, indicating the possible occurrence of eclipsing, the anti-eclipse circuit 30 may be configured to correct the voltage level of the reset signal by pulling the reset level up to a corrected voltage, thereby minimizing the eclipse effect.

Figure 3:
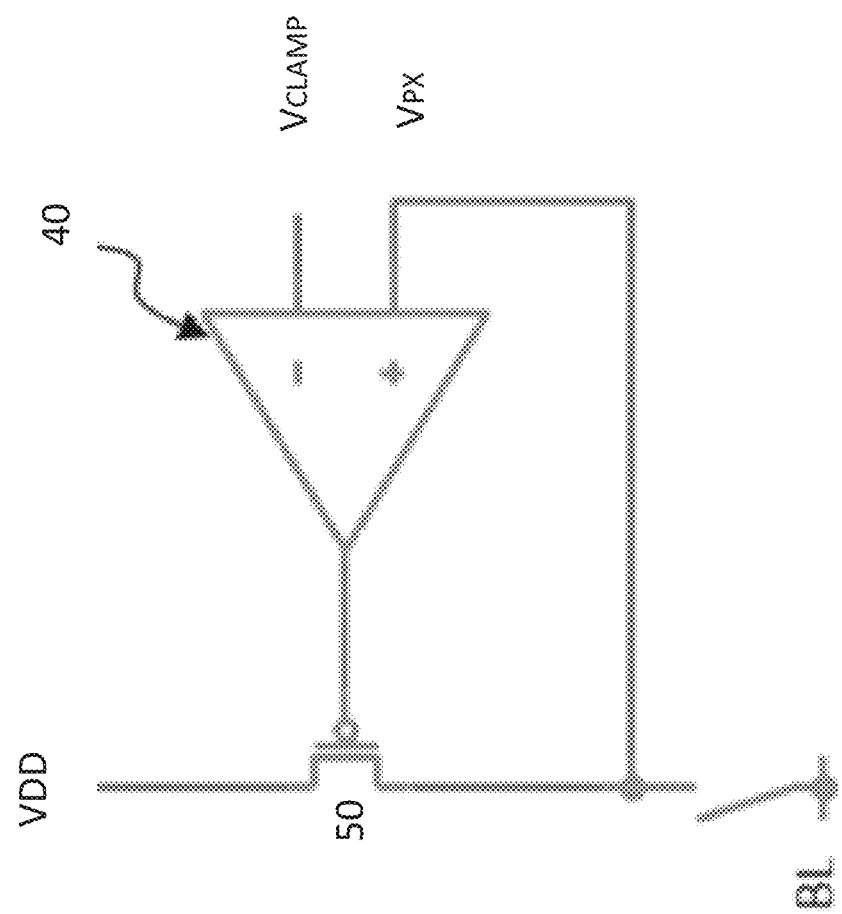
FIG. 3 is a schematic diagram illustrating the equivalent circuit of an anti-eclipse circuit of FIG. 1B in accordance with at least some embodiments of the present disclosure.

FIG. 3 is a schematic diagram illustrating the equivalent circuit of the anti-eclipse circuit 30 of FIG. 1B in accordance with at least some embodiments of the present disclosure. As depicted, the transistor M5 of FIG. 1B may function as a pseudo differential amplifier 40, while the transistors M6 and M7 of FIG. 1B may form a feedback transistor 50. The pseudo differential amplifier 40 controls the conductivity of the feedback transistor 50 according to the difference between the clamp voltage $V_{CLAMP}$ and the pixel voltage $V_{PX}$. More specifically, the transistor M5 equivalently compares its gate voltage with the pixel voltage $V_{PX}$. The clamp voltage $V_{CLAMP}$ level is set so that if the voltage on the floating diffusion region FD degrades while the reset signal Vrst is being output, the transistor M7 conducts and pulls the voltage of the output line BL up to an expected corrected voltage Vrst". Since the gate voltage of the transistor M7 decreases as the transistor M5 becomes conducting, the transistor M7 is turned on when the difference between the pixel voltage VDD and its gate voltage exceeds its threshold voltage. The conducting transistor M7 operates as a current driver and keeps the corrected voltage Vrst" at a constant level.

Figure 6:
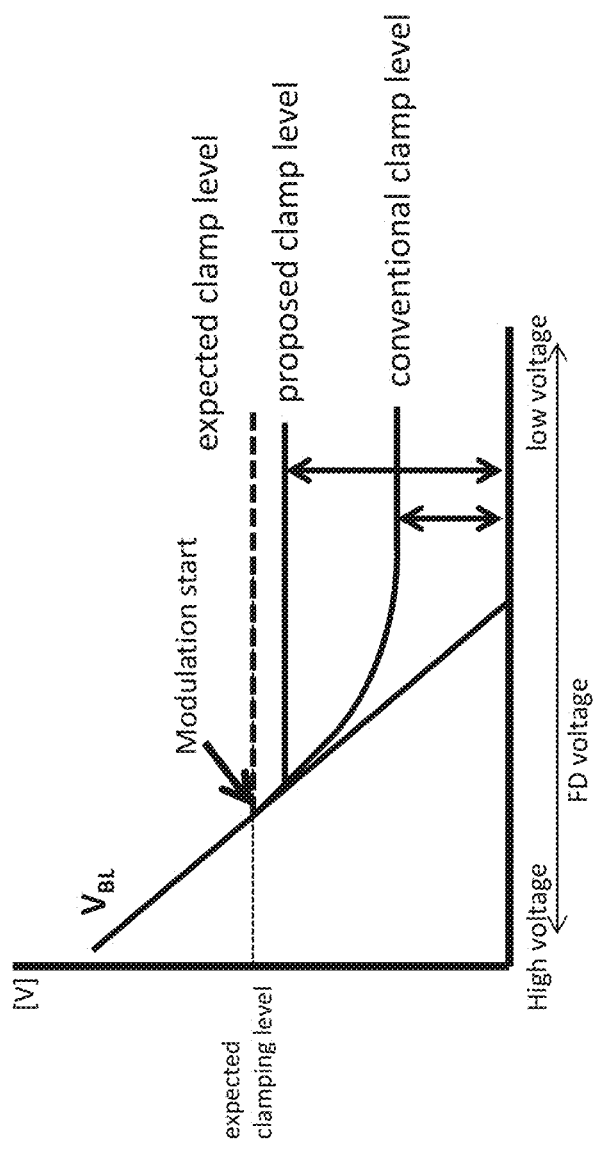
FIG. 6 illustrates a comparison of the clamp levels between the conventional anti-eclipse circuit of FIG. 1A and the anti-eclipse circuit of FIG. 1B, in accordance with at least some embodiments of the present disclosure

In order to reduce readout time of the pixel 100, the output $I_{LOAD}$ of the load circuit 20 may need to be elevated. Unlike the conventional anti-eclipse circuit illustrated in FIG. 1A, the transistor M7 illustrated in FIG. 1B in the present disclosure provides a feedback scheme which keeps the corrected voltage Vrst" at a constant level irrespective of the amount of load current $I_{LOAD}$. FIG. 6 illustrates a comparison of the clamp levels between the conventional anti-eclipse circuit of FIG. 1A (e.g., the illustrated conventional clamp level) and the anti-eclipse circuit of FIG. 1B (e.g., the illustrated proposed clamp level), in accordance with at least some embodiments of the present disclosure.

Figure 4:
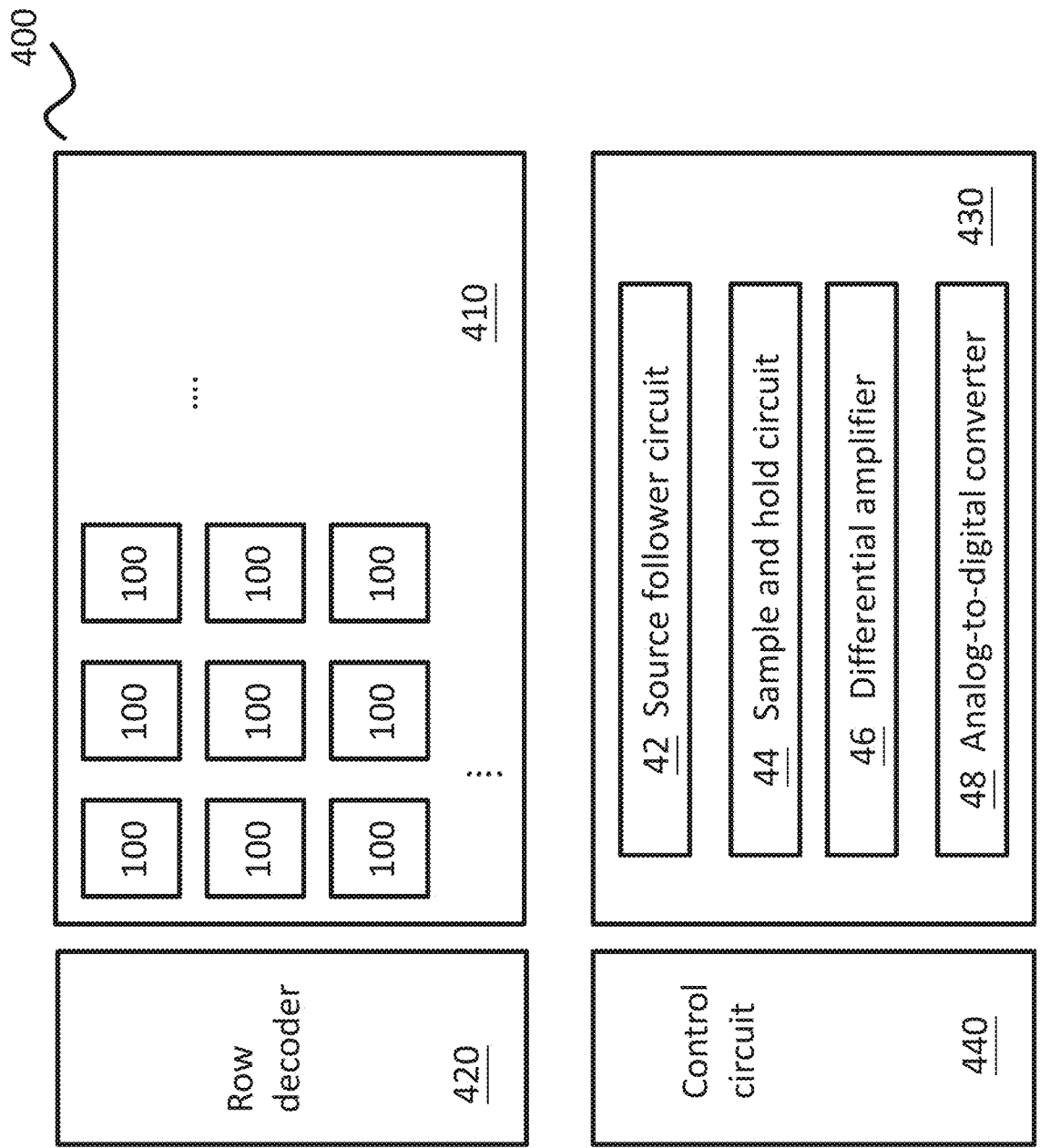
FIG. 4 is a schematic diagram of a CMOS imager device in accordance with at least some embodiments of the present disclosure.

FIG. 4 is a block diagram of a CMOS imager device 400 in accordance with at least some embodiments of the present disclosure. The CMOS imager device 400 includes a pixel array 410, a row decoder circuit 420, a column readout circuit 430, and a control circuit 440. The pixel array 410 may be constructed using multiple pixels 100 as described above, or as other known pixel cell circuits. Pixel array 410 includes a plurality of pixels arranged in a predetermined number of columns and rows and a plurality of row and column select lines are provided for the entire pixel array 410 (not shown). The pixels of each row in the pixel array 410 may be turned on at the same time by a row select line, and the pixels of each column may be selectively output by respective column select lines. The row select lines are selectively activated in sequence by the row decoder circuit 420. The column select lines are selectively activated in sequence for each row activation by the source follower circuit 430.

The CMOS imager device 400 is operated by the control circuit 440, which controls address decoders and driver circuitry in the row decoder circuit 420 and the column readout circuit 430 for selecting the appropriate row and column lines for pixel readout.

The column readout circuit 430 includes a source follower circuit 42, a sample and hold circuit 44, a differential amplifier 46 and an analog-to-digital converter 48. The source follower circuit 42 may be constructed using multiple source followers 200 as described above, As previously stated, the pixel output signals typically include a pixel reset signal Vrst and a photo signal Vsig. The Vrst and Vsig signals may be sampled by the sample and hold circuit 44 and then subtracted by the differential amplifier 46 to produce a differential signal (Vrst−Vsig) for each pixel. This difference signal (Vrst−Vsig) may be digitized by the analog-to-digital converter 48. The digitized pixel signals are fed to an image processor (not shown) to form a digital image output.

Figure 5:
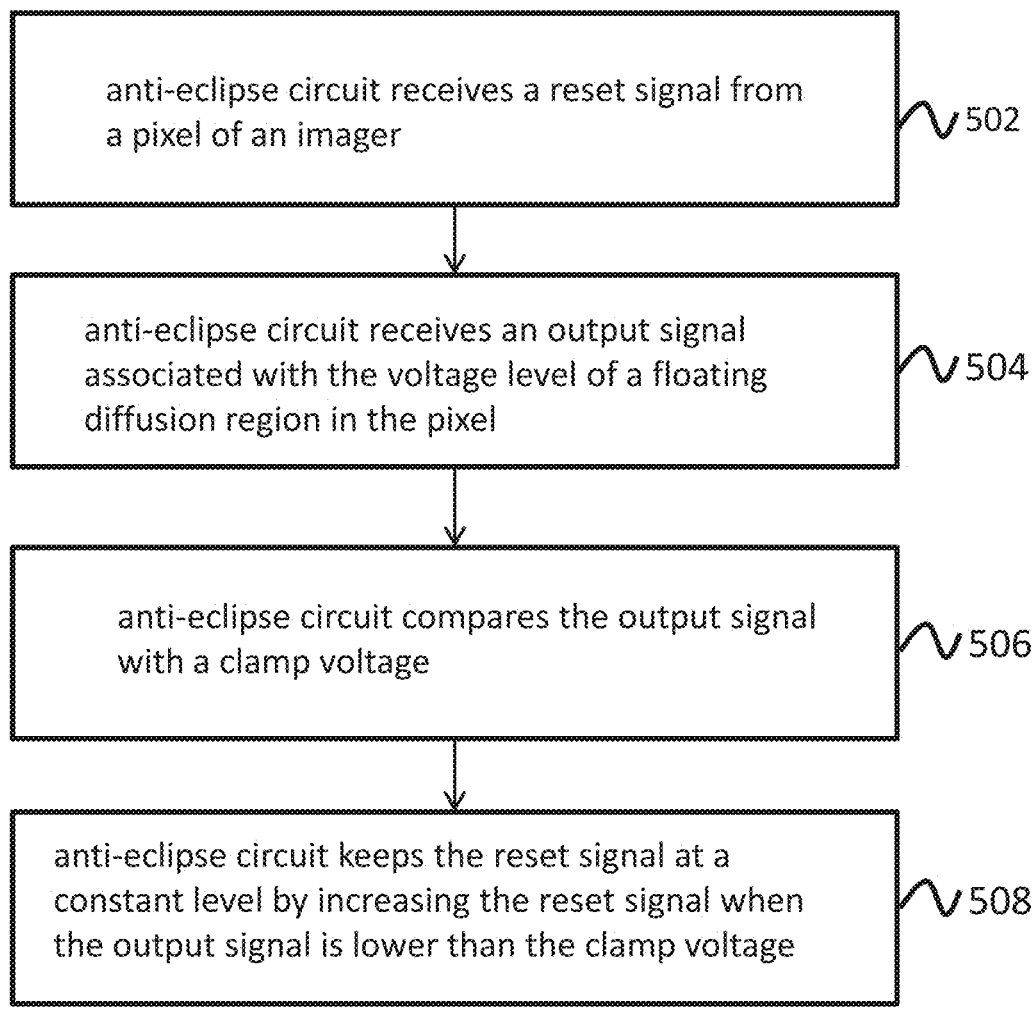
FIG. 5 is a flowchart of an illustrative embodiment of a method for operating an imager in accordance with at least some embodiments of the present disclosure.

FIG. 5 is a flowchart of an illustrative embodiment of a method 500 for operating an imager in accordance with at least some embodiments of the present disclosure. Method 500 may include one or more operations, functions or actions as illustrated by one or more of blocks 502, 504, 506, and/or 508. The various blocks may be combined into fewer blocks, divided into additional blocks, and/or eliminated based upon the desired implementation.

Processing for method 500 may begin at block 502, "anti-eclipse circuit receives a reset signal from a pixel of an imager." Block 502 may be followed by block 504, "anti-eclipse circuit receives an output signal associated with the voltage level of a floating diffusion region in the pixel." Block 504 may be followed by block 506, "anti-eclipse circuit compares the output signal with a clamp voltage." Block 506 may be followed by block 508, "anti-eclipse circuit keeps the reset signal at a constant level by increasing the reset signal when the output signal is lower than the clamp voltage."

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. An imager, comprising:
    an array of pixels arranged in rows and columns;
    an output line for receiving an output signal associated with a voltage level of a floating diffusion region in a pixel from the array of pixels; and
    an anti-eclipse circuit comprising:
        a differential amplifier including a first transistor having:
            a first terminal;
            a second terminal coupled to the output line; and
            a control terminal coupled to a clamp voltage; and
        a feedback circuit including:
            a second transistor having:
                a first terminal coupled to the first terminal of the first transistor;
                a second terminal coupled to a pixel voltage; and
                a control terminal coupled to a bias voltage; and
            a third transistor having:
                a first terminal coupled to the second terminal of the first transistor;
                a second terminal coupled to the second terminal of the second transistor; and
                a control terminal coupled between the first terminal of the first transistor and the first terminal of the second transistor;
    wherein:
    the anti-eclipse circuit is configured to:
        detect when a reset signal received from the pixel drops below a predetermined level, and
        keep the reset signal at a constant level after the reset signal drops below the predetermined level, wherein the constant level is irrelevant to an amount of load current of the pixel, and
    the differential amplifier is coupled in parallel with the pixel and configured to compare the output signal with the clamp voltage; and
    the feedback circuit is configured to increase the reset signal when the output signal is lower than the clamp voltage, thereby keeping the reset signal at the constant level.

2. The imager of claim 1, further comprising:
    a switch coupled between the second terminal of the first transistor and the output line.

3. The imager of claim 1, further comprising:
a load circuit coupled in series to the pixel and configured to provide the load current for a readout of the pixel.

4. An anti-eclipse circuit for use in an imager, comprising:
a differential amplifier coupled to an output line for receiving an output signal associated with a voltage level of a floating diffusion region in a pixel of the imager and configured to detect when a reset signal received from the pixel drops below a predetermined level, wherein the differential amplifier includes a first transistor having:
 a first terminal;
 a second terminal coupled to the output line; and
 a control terminal coupled to a clamp voltage; and
a feedback circuit configured to increase the reset signal when the output signal is lower than the clamp voltage, thereby keeping the reset signal at the constant level, wherein:
 the constant level is irrelevant to an amount of load current of the pixel;
 the feedback circuit includes:
  a second transistor having:
   a first terminal coupled to the first terminal of the first transistor;
   a second terminal coupled to a pixel voltage; and
   a control terminal coupled to a bias voltage; and
  a third transistor including:
   a first terminal coupled to the second terminal of the first transistor;
   a second terminal coupled to the second terminal of the second transistor; and
   a control terminal coupled between the first terminal of the first transistor and the first terminal of the second transistor.

\* \* \* \* \*